United States Patent
Irie et al.

(10) Patent No.: US 10,212,354 B2
(45) Date of Patent: Feb. 19, 2019

(54) MOVABLE IMAGING DEVICE AND MOVABLE IMAGING METHOD

(71) Applicant: FUJIFILM Corporation, Tokyo (JP)

(72) Inventors: Fuminori Irie, Saitama (JP); Mikio Watanabe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/845,615

(22) Filed: Dec. 18, 2017

(65) Prior Publication Data

US 2018/0124326 A1 May 3, 2018

Related U.S. Application Data

(63) Continuation of application No. PCT/JP2016/066237, filed on Jun. 1, 2016.

(30) Foreign Application Priority Data

Jun. 30, 2015 (JP) .................... 2015-131290

(51) Int. Cl.
*H04N 5/232* (2006.01)
*H04N 5/225* (2006.01)
(Continued)

(52) U.S. Cl.
CPC ......... *H04N 5/23296* (2013.01); *G03B 15/00* (2013.01); *G03B 17/00* (2013.01);
(Continued)

(58) Field of Classification Search
None
See application file for complete search history.

(56) References Cited

U.S. PATENT DOCUMENTS

2007/0183770 A1 8/2007 Aoki et al.
2014/0240451 A1 8/2014 Sakano et al.

FOREIGN PATENT DOCUMENTS

JP 8-128015 A 5/1996
JP 2009-85785 A 4/2009
(Continued)

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2016/066237, dated Jan. 11, 2018, with English translation.
(Continued)

*Primary Examiner* — Mark T Monk
(74) *Attorney, Agent, or Firm* — Birch, Stewart, Kolasch & Birch, LLP

(57) ABSTRACT

A movable imaging device includes a camera, a moving body, a definition calculation unit that calculates definition of an image for inspection, a determination unit that determines whether the definition is equal to or higher than required definition required for inspection accuracy of an object to be inspected, a pan/tilt control unit that operates a pan/tilt mechanism in a case in which the determination unit determines that the calculated definition is equal to or higher than the required definition, a moving body control unit that moves a moving body in a case in which the pan/tilt mechanism is operated and it is determined that the definition is lower than the required definition, and an imaging control unit that images the object to be inspected by the camera in a case in which it is determined that the definition is equal to or higher than the required definition.

17 Claims, 13 Drawing Sheets

(51) Int. Cl.
*G06T 7/00* (2017.01)
*G03B 15/00* (2006.01)
*G03B 17/00* (2006.01)
*G03B 17/56* (2006.01)

(52) U.S. Cl.
CPC ............ *G03B 17/56* (2013.01); *G06T 7/0004* (2013.01); *H04N 5/2257* (2013.01); *H04N 5/23203* (2013.01); *H04N 5/23293* (2013.01); *H04N 5/23299* (2018.08); *H04N 5/232133* (2018.08); *G06T 2207/30184* (2013.01); *H04N 2005/2255* (2013.01)

(56) References Cited

FOREIGN PATENT DOCUMENTS

| | | |
|---|---|---|
| JP | 2014-62433 A | 4/2014 |
| JP | 2014-164363 A | 9/2014 |
| WO | WO 2006/068049 A1 | 6/2006 |

OTHER PUBLICATIONS

International Search Report (Form PCT/ISA/210) for International Application No. PCT/JP2016/066237, dated Jul. 12, 2016, with English translation.
Japanese Decision to Grant a Patent for Japanese Application No. 2017-526229, dated Dec. 18, 2017, with English translation.

MOVABLE IMAGING DEVICE AND MOVABLE IMAGING METHOD

CROSS-REFERENCE TO RELATED APPLICATIONS

The present application is a Continuation of PCT International Application No. PCT/JP2016/066237 filed on Jun. 1, 2016 claiming priority under 35 U.S.C § 119(a) to Japanese Patent Application No. 2015-131290 filed on Jun. 30, 2015. Each of the above applications is hereby expressly incorporated by reference, in their entirety, into the present application.

BACKGROUND OF THE INVENTION

1. Field of the Invention

The present invention relates to a movable imaging device and a movable imaging method, and more particularly, to a movable imaging device and a movable imaging method that image a building structure with a camera including a pan/tilt mechanism to inspect the building structure.

2. Description of the Related Art

In recent years, a building structure, such as a bridge, has been imaged by a camera and the taken image of the building structure has been analyzed by an image processing technique, so that the inspection of the building structure has been performed. For example, the floor slab of a bridge has been imaged by a camera and the taken image of the floor slab has been analyzed, so that inspection for finding a damaged portion of the floor slab, such as a crack, has been performed.

For example, JP2009-85785A discloses a technique that images a wall, such as the lower surface of a floor or the back of a ceiling, by using a camera mounted on a movable robot and inspects cracks and the like.

Further, for example, JP2014-62433A discloses a technique that images a bridge by cameras and performs inspection, and discloses a technique that makes an arm elongate downward from a crane truck installed on the road and images the back surface of the road by a plurality of cameras.

SUMMARY OF THE INVENTION

In regard to inspection that is performed through the imaging of large building structures, such as a bridge, a building, and a nuclear reactor, with a camera, it is desired that the time taken until the completion of the entire inspection is shortened. A method of shortening the moving time of a moving body on which a camera is mounted is considered as a method of shortening the time of the entire inspection.

JP2009-85785A discloses the technique that images and inspects the lower surface of a floor, the back of a ceiling, or the like by a camera including a pan/tilt mechanism, but does not mention a technique that shortens the time required to take an image for inspection.

Further, since the plurality of cameras are used in the technique disclosed in JP2014-62433A, a wide range can be imaged in a short time in comparison with a case in which imaging is performed while one camera is sequentially moved. However, since a large device including the plurality of cameras, the crane truck, the arm, a frame, and the like is required, there is a severe limitation on a place where inspection is performed.

The invention has been made in consideration of the above-mentioned circumstances, and an object of the invention is to provide a movable imaging device and a movable imaging method that can efficiently acquire a high-quality image useable for inspection in a wide range without requiring a large device.

In order to achieve the object, a movable imaging device according to an aspect of the invention is a movable imaging device that images an object to be inspected including a flat surface. The movable imaging device comprises a camera that images the object to be inspected and acquires an image for inspection, a pan/tilt mechanism that rotates the camera in each of a pan direction and a tilt direction, a moving body on which the camera is mounted and which moves the camera along the flat surface of the object to be inspected, a definition calculation unit that calculates definition of the image for inspection acquired by the camera, a determination unit that determines whether the definition calculated by the definition calculation unit is equal to or higher than required definition required for inspection accuracy of the object to be inspected, a pan/tilt control unit that operates the pan/tilt mechanism to move an imaging area on the object to be inspected and operates the pan/tilt mechanism in a case in which the determination unit determines that the calculated definition is equal to or higher than the required definition, a moving body control unit that moves the moving body to move an imaging area on the object to be inspected and moves the moving body in a case in which the pan/tilt mechanism is operated by the pan/tilt control unit and the determination unit determines that the calculated definition is lower than the required definition, and an imaging control unit that makes the camera image the object to be inspected in a case in which the determination unit determines that the calculated definition is lower than the required definition.

According to this aspect, in a case in which the definition of the image for inspection is equal to or higher than the required definition required for the inspection accuracy of the object to be inspected, the pan/tilt mechanism is driven without the movement of the moving body to take the image for inspection. Accordingly, since the moving time of the moving body and the number of times of movement of the moving body can be reduced in this aspect, time required for the entire inspection can be shortened. Further, according to this aspect, the moving body is moved to the next imaging position in a case in which the definition of the image for inspection is lower than the required definition required for the inspection accuracy of the image for inspection. Therefore, a high-quality image for inspection, which can satisfy required inspection accuracy, can be acquired in this aspect. Furthermore, according to this aspect, it is possible to acquire the image for inspection of a wide range without requiring a relatively large device by controlling the actuation of the pan/tilt mechanism and the movement of the moving body.

Preferably, the definition calculation unit includes a subject distance acquiring unit for acquiring a subject distance in a case in which the image for inspection is to be acquired by the camera, and calculates the definition of the image for inspection on the basis of the acquired subject distance, an angle of view of the camera, and the number of pixels of an imaging element of the camera.

According to this aspect, the subject distance in a case in which the image for inspection is acquired is acquired, and the definition of the image for inspection is calculated on the basis of the subject distance, the angle of view of the camera, and the number of pixels of the imaging element of the camera. Accordingly, since the definition corresponding to the subject distance can be accurately calculated in this aspect, inspection accuracy can be improved.

Preferably, the definition calculation unit includes an imaging angle acquiring unit for acquiring an imaging angle that is an angle between an optical axis of the camera and the flat surface of the imaging area, and calculates the definition of the image for inspection on the basis of the acquired subject distance, the angle of view of the camera, the acquired imaging angle, and the number of pixels of the imaging element of the camera.

According to this aspect, the imaging angle, which is the angle between the optical axis of the camera and the flat surface of the imaging area, is acquired and the definition of the image for inspection is calculated on the basis of the subject distance, the angle of view of the camera, the imaging angle, and the number of pixels of the imaging element of the camera. Accordingly, since the definition corresponding to the imaging angle can be accurately calculated in this aspect, inspection accuracy can be improved.

Preferably, the imaging control unit includes an imaging condition determining unit that determines an imaging condition of the camera, and the imaging condition determining unit determines the imaging condition on the basis of the imaging angle that is acquired by the imaging angle acquiring unit.

According to this aspect, since the imaging condition of the camera is determined on the basis of the imaging angle, a good-quality image for inspection, which is taken under an appropriate imaging condition in accordance with the imaging angle, can be acquired.

Preferably, the imaging control unit performs focus bracket imaging for taking an image with the movement of a focus position in a case in which the imaging angle acquired by the imaging angle acquiring unit is equal to or smaller than a reference angle.

According to this aspect, focus bracket imaging for taking images at a plurality of focus positions is performed in a case in which the imaging angle is equal to or smaller than the reference angle. Accordingly, a high-quality image for inspection of which blurring is suppressed can be acquired even in a case in which the imaging angle is large.

Preferably, the imaging control unit determines the number of times of the focus bracket imaging or a moving distance of a focus in the focus bracket imaging on the basis of at least one of the imaging angle, the subject distance, and a diaphragm value of the camera.

According to this aspect, the number of times of the focus bracket imaging or the moving distance of a focus in the focus bracket imaging is determined on the basis of at least one of the imaging angle, the subject distance, and the diaphragm value of the camera. Accordingly, since more appropriate focus bracket imaging can be performed in this aspect, a higher-quality image for inspection can be acquired.

Preferably, the definition calculation unit calculates definition at an end portion of the imaging area that is most distant from the camera.

According to this aspect, definition at an end portion of the imaging area, which is most distant from the camera, is calculated and it is determined whether the calculated definition is equal to or higher than the required definition required for inspection accuracy. Accordingly, in this aspect, whether the calculated definition is equal to or higher than the required definition is determined on the basis of the definition of a portion of the image for inspection of which the definition may be lowest. Therefore, inspection accuracy can be improved.

Preferably, the definition calculation unit corrects the definition, which is calculated, on the basis of optical characteristics of an optical system of the camera.

According to this aspect, since the definition is corrected on the basis of the optical characteristics of the optical system of the camera, definition corresponding to the optical characteristics is calculated. Accordingly, since the definition corresponding to the characteristics of the optical system of the camera is calculated in this aspect, a higher-quality image for inspection can be acquired.

Preferably, the pan/tilt control unit controls the pan/tilt mechanism during the movement of the moving body performed by the moving body control unit, and tracks the imaging area imaged before the start of the movement of the moving body.

According to this aspect, since the moving body is moved while the imaging area imaged is tracked before the start of the movement of the moving body, it is possible to shorten time taken to search the imaging area again in a case in which the moving body reaches the next imaging position. Accordingly, inspection can be efficiently performed.

Preferably, in a case in which the movement of the moving body is started, the moving body control unit moves the moving body to the most distant position at which the object to be inspected is capable of being continuously imaged through an operation of the pan/tilt mechanism performed by the pan/tilt control unit.

According to this aspect, since the moving body is moved to the most distant position at which the object to be inspected is capable of being continuously imaged through the operation of the pan/tilt mechanism, the widest image for an object to be inspected can be taken by the use of the pan/tilt mechanism to the maximum. Accordingly, since the number of times of movement of the moving body or the moving distance of the moving body can be suppressed in this aspect, more efficient inspection can be performed.

Preferably, the movable imaging device further comprises a next-imaging-area specifying unit that specifies a part or all of an area of the object to be inspected, of which an image for inspection is not taken, as the next imaging area on the basis of the image for inspection taken by the camera.

According to this aspect, since a part or all of an area of the object to be inspected, of which an image for inspection is not taken, is specified as the next imaging area on the basis of the already taken image for inspection, unnecessary imaging, such as doubly imaging the same area, is suppressed. Accordingly, inspection can be more efficiently performed.

Preferably, the camera includes an imaging optical system of which an imaging magnification is adjustable.

According to this aspect, since the imaging magnification of the imaging optical system of the camera can be adjusted, an image for inspection more suitable for inspection can be taken. Accordingly, inspection accuracy can be improved.

Preferably, the movable imaging device further comprises a live-view image display unit that displays a live-view image taken by the camera, a pan/tilt operating unit that outputs a pan/tilt command to the pan/tilt mechanism by a manual operation, and an information unit that issues a warning in a case in which the determination unit determines that the definition calculated by the definition calculation unit is lower than the required definition required for the inspection accuracy of the object to be inspected. The pan/tilt control unit controls the pan/tilt mechanism on the basis of the pan/tilt command output from the pan/tilt operating unit.

According to this aspect, a warning is displayed to a user in a case in which it is determined that the definition calculated by the definition calculation unit is lower than the required definition required for the inspection of the object to be inspected even though the pan/tilt mechanism is manually operated. Accordingly, since the acquisition of an image for inspection of which the definition is lower than the required definition is prevented in this aspect, a more accurate image for inspection can be acquired. Therefore, inspection accuracy can be improved.

Preferably, the movable imaging device further comprises a pan/tilt operating unit that outputs a pan/tilt command to the pan/tilt mechanism by a manual operation, and a pan/tilt stop unit that outputs a stop command for stopping the drive of the pan/tilt mechanism in a case in which the determination unit determines that the definition calculated by the definition calculation unit is lower than the required definition required for the inspection accuracy of the object to be inspected. The pan/tilt control unit controls the pan/tilt mechanism on the basis of the pan/tilt command output from the pan/tilt operating unit and the stop command output from the pan/tilt stop unit.

According to this aspect, the drive of the pan/tilt mechanism is forcibly stopped in a case in which it is determined that the definition calculated by the definition calculation unit is lower than the required definition required for the inspection of the object to be inspected even though the pan/tilt mechanism is manually operated. Accordingly, since the acquisition of an image for inspection of which the definition is lower than the required definition is prevented in this aspect, a more accurate image for inspection can be acquired. Therefore, inspection accuracy can be improved.

Preferably, the movable imaging device further comprises a movement operating unit that outputs a movement command to the moving body by a manual operation, and an information unit that informs a user that the image for inspection is capable of being taken in a case in which the determination unit determines that the definition calculated by the definition calculation unit is equal to or higher than the required definition required for the inspection accuracy of the object to be inspected. The moving body control unit controls the moving body on the basis of the movement command output from the movement operating unit.

According to this aspect, since the user is informed of the fact that an image for inspection can be taken with definition equal to or higher than the required definition even though the moving body is manually operated, an image for inspection, which satisfies the required definition required for the inspection accuracy of an object, can be efficiently acquired.

Preferably, the movable imaging device further comprises a movement operating unit that outputs a movement command to the moving body by a manual operation, and a moving body stop unit that outputs a stop command for stopping the movement of the moving body in a case in which the determination unit determines that the definition calculated by the definition calculation unit is equal to or higher than the required definition required for the inspection accuracy of the object to be inspected. The moving body control unit controls the moving body on the basis of the movement command output from the movement operating unit and the stop command output from the moving body stop unit.

According to this aspect, the moving body is forcibly stopped in a case in which it is determined that an image for inspection can be taken with definition equal to or higher than the required definition even though the moving body is manually operated. Accordingly, an image for inspection, which satisfies the required definition required for the inspection accuracy of an object, can be efficiently acquired in this aspect.

A movable imaging method according to another aspect of the invention is a movable imaging method of imaging an object to be inspected including a flat surface and using a movable imaging device including a camera that images the object to be inspected and acquires an image for inspection, a pan/tilt mechanism that rotates the camera in each of a pan direction and a tilt direction, and a moving body on which the camera is mounted and which moves the camera along the flat surface of the object to be inspected. The movable imaging method comprises a definition calculating step of calculating definition of the image for inspection acquired by the camera, a determination step of determining whether the definition calculated by the definition calculating step is equal to or higher than required definition required for inspection accuracy of the object to be inspected, a pan/tilt control step of operating the pan/tilt mechanism to move an imaging area on the object to be inspected and operating the pan/tilt mechanism in a case in which it is determined in the determination step that the calculated definition is equal to or higher than the required definition, a moving body control step of moving the moving body to move an imaging area on the object to be inspected and moving the moving body in a case in which the pan/tilt mechanism is operated in the pan/tilt control step and it is determined in the determination step that the calculated definition is lower than the required definition, and an imaging control step of imaging the object to be inspected by the camera in a case in which it is determined in the determination step that the calculated definition is equal to or higher than the required definition.

According to the invention, it is possible to shorten the time required for the entire inspection by reducing the moving time of a moving body and the number of times of movement of the moving body and to acquire a high-quality image for inspection, which can satisfy the required inspection accuracy, without requiring a large device.

DESCRIPTION OF THE PREFERRED EMBODIMENTS

A preferred embodiment of the invention will be described below with reference to accompanying drawings.

Figure 1:
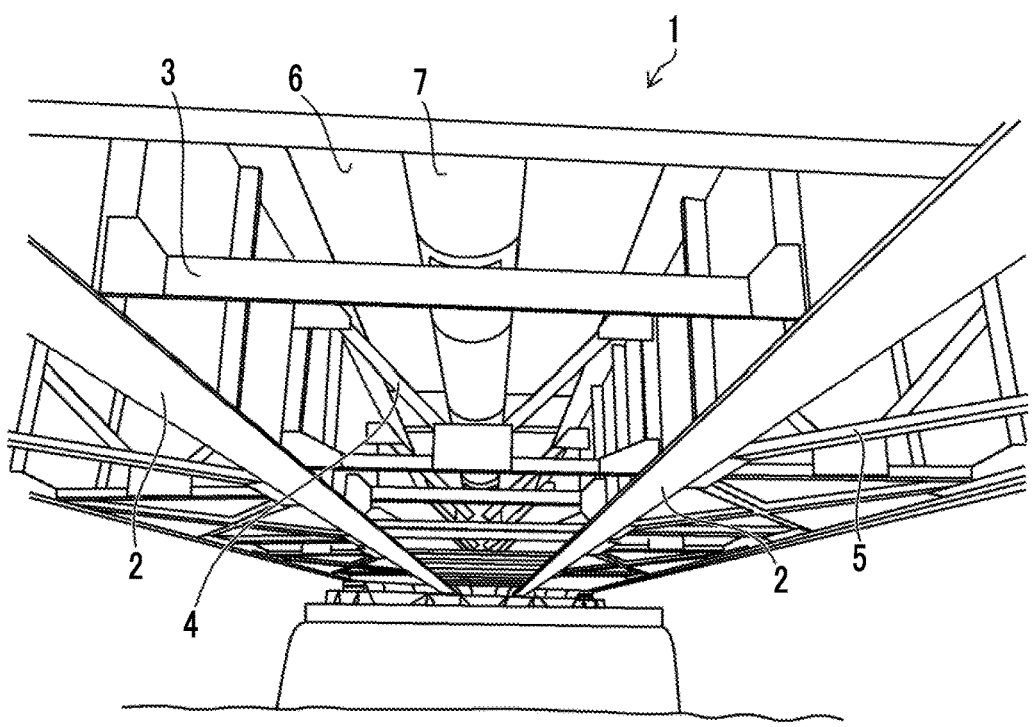
FIG. 1 is a perspective view showing the structure of a bridge that is a building structure.

FIG. 1 is a perspective view showing the structure of a bridge that is a building structure, and is a diagram showing the bridge from below. A movable imaging device and a movable imaging method according to the invention are suitably used for the inspection of building structures such as a bridge 1 shown in FIG. 1. Examples of other structures include a building, a nuclear power plant, and a three-dimensional expressway.

The bridge 1 shown in FIG. 1 includes main girders 2, cross beams 3, cross frames 4, and lateral frames 5; and the main girders 2, the cross beams 3, the cross frames 4, and the lateral frames 5 are connected to each other by bolts, rivets, or welding. Further, floor slabs 6 on which vehicles and the like travel are installed on the main girders 2 and the like. The floor slab 6 is generally made of reinforced concrete.

The main girder 2 is a member that is provided between abutments or piers and supports the load of vehicles and the like present on the floor slab 6. The cross beam 3 is a member that connects the main girders 2 to support a load by the plurality of main girders 2. The cross frame 4 and the lateral frame 5 are members that connect the main girders 2 to resist a lateral load of wind, earthquake, or the like. Further, pipes 7 are provided below the bridge 1 of this example.

Figure 2:
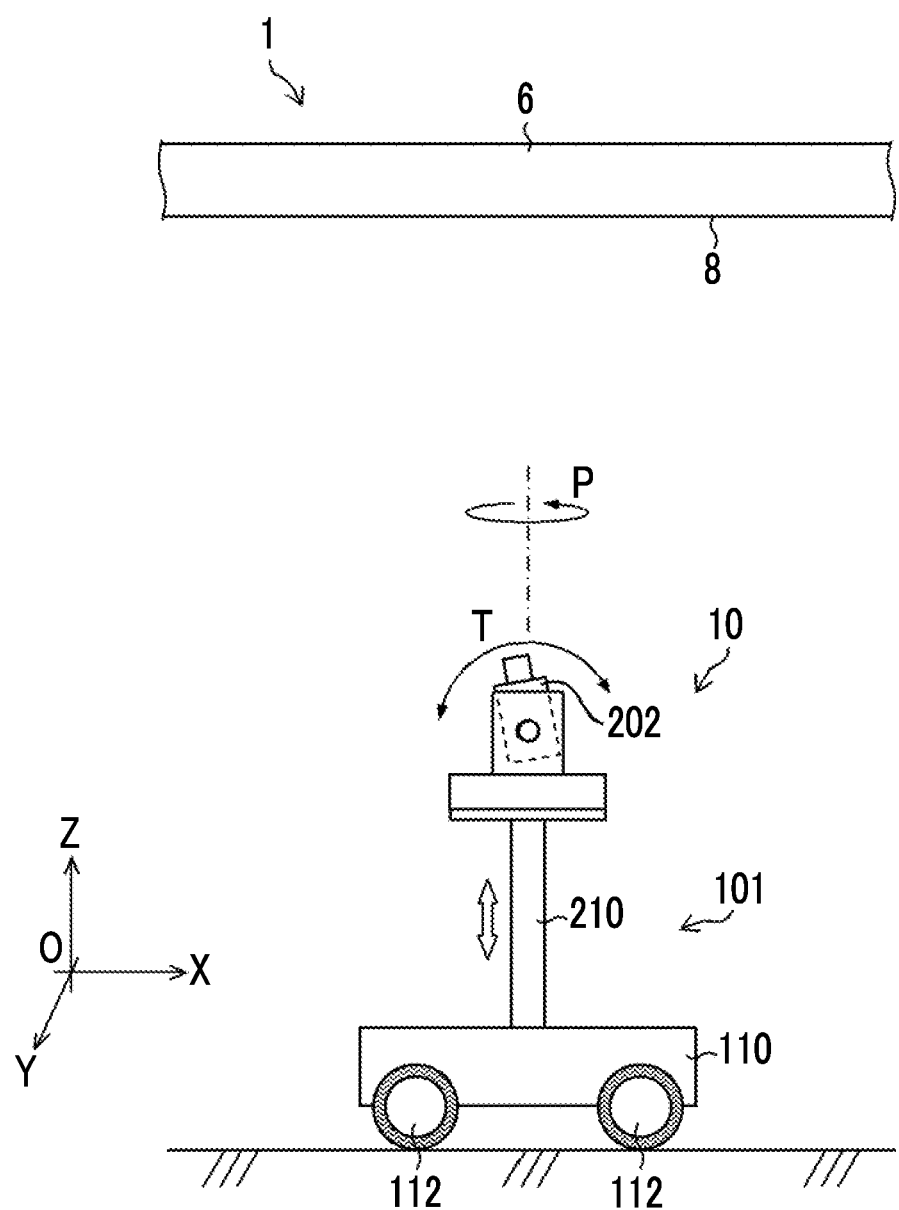
FIG. 2 is a vertical cross-sectional view showing the appearance of a movable imaging device.

FIG. 2 is a vertical cross-sectional view showing the appearance of the movable imaging device. The vertical cross-sectional view is a cross-sectional view in which a vertical direction is a Z-axis direction and which is taken along a Z-X plane. FIG. 2 shows an aspect in which an image for inspection relating to the floor slab 6 of the bridge 1 is taken from below the bridge 1. An object to be inspected is a back-side flat surface (back surface 8) of the floor slab 6 of the bridge 1, and a movable imaging device 10 acquires an image for inspection by imaging the back surface 8 of the floor slab 6. The movable imaging device 10 is installed on the ground and takes an image for inspection relating to the back surface 8 of the floor slab 6 upward from below the bridge 1 (in an X-axis direction of FIG. 2).

The movable imaging device 10 is mainly composed of a camera 202, a vertical telescopic arm 210, and a moving body-main body 110. The camera 202 including a pan/tilt mechanism is mounted on the upper end of the vertical telescopic arm 210. Further, the lower end of the vertical telescopic arm 210 is connected to the moving body-main body 110. The vertical telescopic arm 210 can freely elongate and contract in the vertical direction, and the vertical telescopic arm 210 elongates or contracts in accordance with conditions required for the image for inspection. Further, since the moving body-main body 110 is provided with wheels 112, a moving body 101 can be moved along the back surface 8 of the floor slab 6 that is an object to be inspected. That is, the moving body 101 can be moved along the floor slab 6 in the X-axis direction and a Y-axis of FIG. 2 by the wheels 112.

Figure 3:
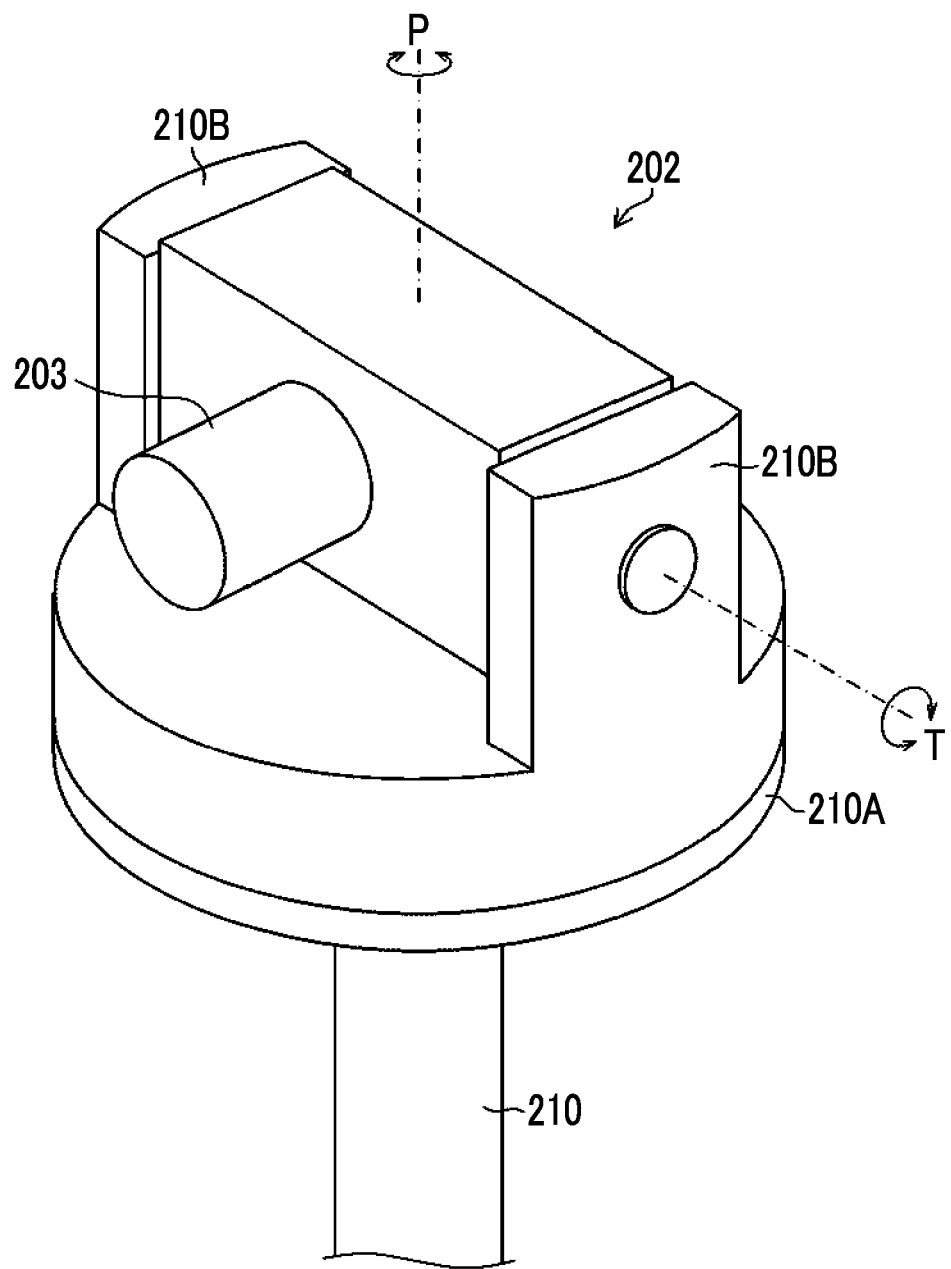
FIG. 3 is a perspective view showing a portion of the movable imaging device near a camera.

FIG. 3 is a perspective view showing a portion of the movable imaging device 10 near the camera 202. Since a camera installation part 210A is provided at the upper end of the vertical telescopic arm 210 as shown in FIG. 3, the camera installation part 210A is rotated in a pan direction (indicated in FIG. 3 by an arrow P), so that the imaging direction of the camera 202 can be controlled in the pan direction. The camera 202 is supported by a camera support part 210B and is rotated in a tilt direction (indicated in FIG. 3 by an arrow T), so that the imaging direction of the camera 202 can be controlled in the tilt direction. Since the camera 202 includes the pan/tilt mechanism as described above, the camera 202 can take an image for inspection in an arbitrary imaging direction. The pan/tilt mechanism is composed of the camera installation part 210A and the camera support part 210B.

An imaging optical system 203 of the camera 202 is not particularly limited, and various imaging optical systems can be used. For example, a zoom lens, which is the imaging optical system 203 of which an imaging magnification is adjustable, can also be used. Further, a fixed focus lens can also be used as the imaging optical system 203 of the camera 202.

Since the camera 202 can acquire a video and a static image as the image for inspection, the camera 202 can acquire a video or a static image in accordance with inspection. An imaging element of the camera 202 is composed of a complementary metal-oxide semiconductor (CMOS) color image sensor. The imaging element is not limited to a CMOS image sensor, and may be an XY address image sensor or a charge coupled device (CCD) image sensor.

Figure 4:
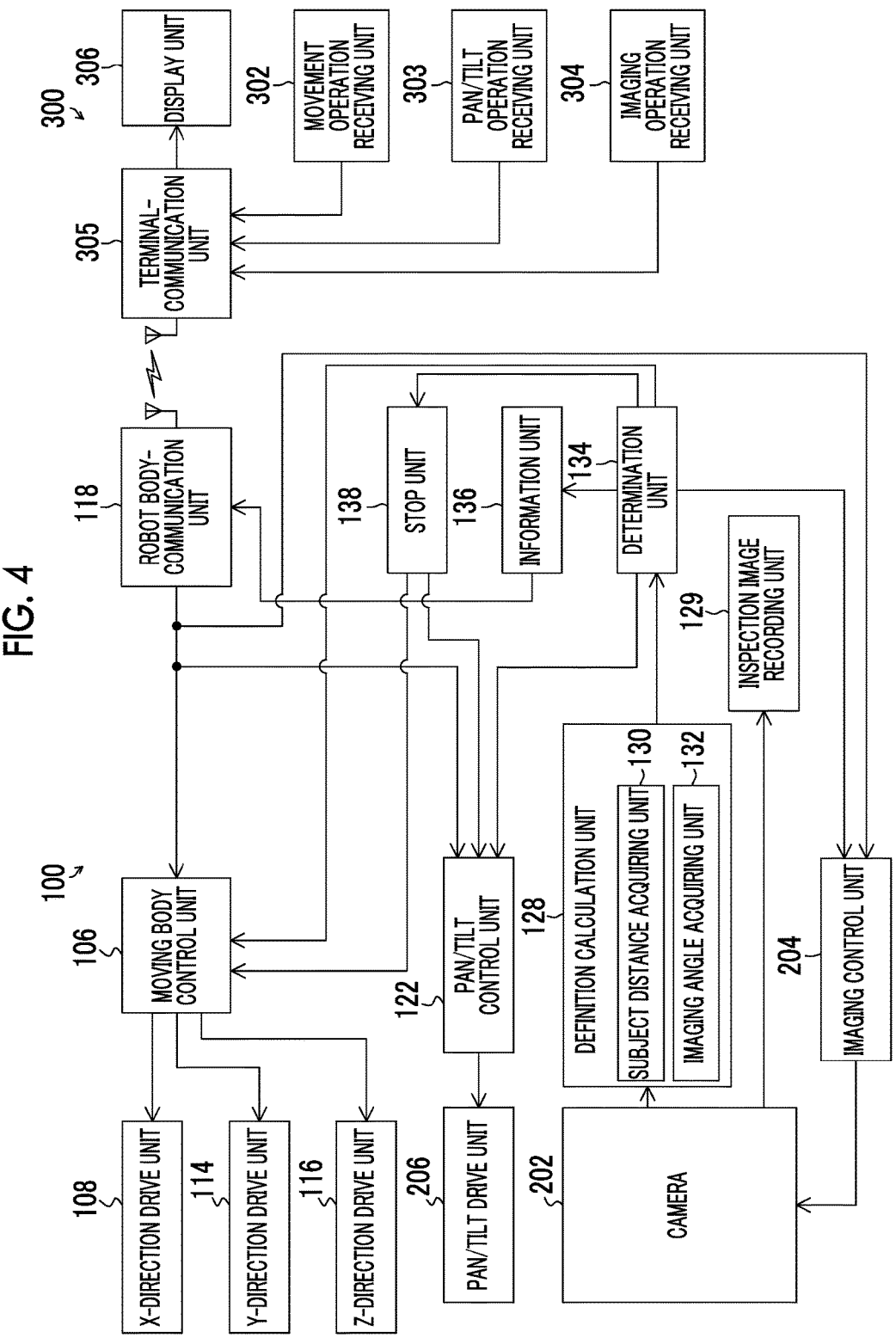
FIG. 4 is a block diagram showing the functional configuration of the movable imaging device.

FIG. 4 is a block diagram showing the functional configuration of the movable imaging device 10. The movable imaging device 10 is mainly composed of a robot body 100 and a terminal 300, and the robot body 100 and the terminal 300 can wirelessly communicate with each other. The functional configuration shown in FIG. 4 is one example, and the functional configuration of the movable imaging device is not particularly limited thereto. For example, the movable imaging device 10 may be composed of only the robot body 100, and the robot body 100 and the terminal 300 may be connected to each other by wires.

First, the configuration of the robot body 100 and processing performed by the robot body 100 will be outlined.

An X-direction drive unit 108 and a Y-direction drive unit 114 drive the movable imaging device 10 in the X direction and a Y direction (see FIG. 2). Further, a Z-direction drive unit 116 makes the vertical telescopic arm 210 elongate and contract in a Z direction (see FIG. 2).

A user gives a movement command for moving the moving body 101 through a movement operation receiving unit 302 (movement operating unit) of the terminal 300. The movement command, which is received from the user by the movement operation receiving unit 302, is transmitted to a robot body-communication unit 118 through a terminal-communication unit 305. After that, the movement command is sent to a moving body control unit 106, and the moving body control unit 106 controls the drive of the X-direction drive unit 108, the drive of the Y-direction drive unit 114, and the drive of the Z-direction drive unit 116 on the basis of the movement command. Accordingly, the moving body 101 is moved in the X direction, the Y direction, and the Z direction, so that the camera 202 can be moved to an imaging position desired by the user.

A pan/tilt drive unit 206 actuates the pan/tilt mechanism. Rotation in the pan direction is achieved by the rotation of the camera installation part 210A, and rotation in the tilt direction is achieved by the rotation of the camera 202, which is supported on the camera support part 210B, in the tilt direction.

The user gives a pan/tilt command for actuating the pan/tilt mechanism through a pan/tilt operation receiving unit 303 (pan/tilt operating unit) of the terminal 300. The pan/tilt command, which is received by the pan/tilt operation receiving unit 303, is transmitted to the robot body-communication unit 118 through the terminal-communication unit 305. After that, the pan/tilt command is transmitted to a pan/tilt control unit 122, and the pan/tilt control unit 122 actuates the pan/tilt drive unit 206 on the basis of the pan/tilt command. Accordingly, the imaging direction of the camera 202 can be changed in the pan direction and the tilt direction, so that the camera 202 can acquire an image for inspection of a wide range without the change in the position of the moving body 101.

Further, the moving body 101 can also be actuated according to an inspection plan. For example, spatial information of an object to be inspected and spatial coordinates representing the imaging positions of images for inspection are stored in advance, and the movable imaging device 10 can be sequentially moved to the determined imaging positions to take images for inspection. Furthermore, the pan/tilt drive unit 206 can also be actuated according to an inspection plan as in the case of the moving body 101.

The camera 202 takes and acquires an image for inspection. The camera 202 used here is not particularly limited, and is selected from the viewpoint of image quality that is required for the image for inspection, the weight of the camera that can be mounted on the moving body 101, and the like. The camera 202 can acquire a static image and a video and acquires a live-view image (through image), and the acquired live-view image is displayed on a display unit 306 of the terminal 300.

The user can give an imaging command for actuating the camera 202 through an imaging operation receiving unit 304. The imaging command, which is received by the imaging operation receiving unit 304, is transmitted to the robot body-communication unit 118 through the terminal-communication unit 305. After that, the imaging command is transmitted to an imaging control unit 204, and the imaging control unit 204 actuates the camera 202 on the basis of the imaging command. The imaging control unit 204 can also acquire an image for inspection by the camera 202 on the basis of an inspection plan as in the cases of the moving body 101 and the pan/tilt mechanism having described above.

The image for inspection, which is acquired by the camera 202, is recorded in an inspection image recording unit 129. A video or a static image is recorded in the inspection image recording unit 129. Further, the image for inspection may be immediately displayed on the display unit 306 of the terminal 300 after being taken.

A definition calculation unit 128 calculates the definition of an image for inspection that is acquired by the camera 202. Here, the definition of the image for inspection can also be referred to as the resolution of the image for inspection, and is an index indicating that an image is clear enough to be capable of being inspected. For example, in a case in which the definition of an image for inspection is equal to or higher than required definition required for inspection accuracy, defects (scratches, cracks, and the like) of an object to be inspected can be identified from the image for inspection. The required definition is definition that is set in advance in consideration of inspection accuracy, the performance of the camera 202, and the like. For example, the required definition may be definition where the definition of the image for inspection is the minimum definition required for inspection accuracy, and may be definition where the definition of the image for inspection is set to be higher than the minimum definition required for inspection accuracy by 10%.

Various indexes, which can represent the resolution of the image for inspection, can be employed as the definition. For example, the number of pixels of an imaging area per unit length (the number of pixels/m) may be used as the definition. Since the definition is calculated as described above, the resolution and inspection accuracy required for the image for inspection can be appropriately determined.

Figure 5:
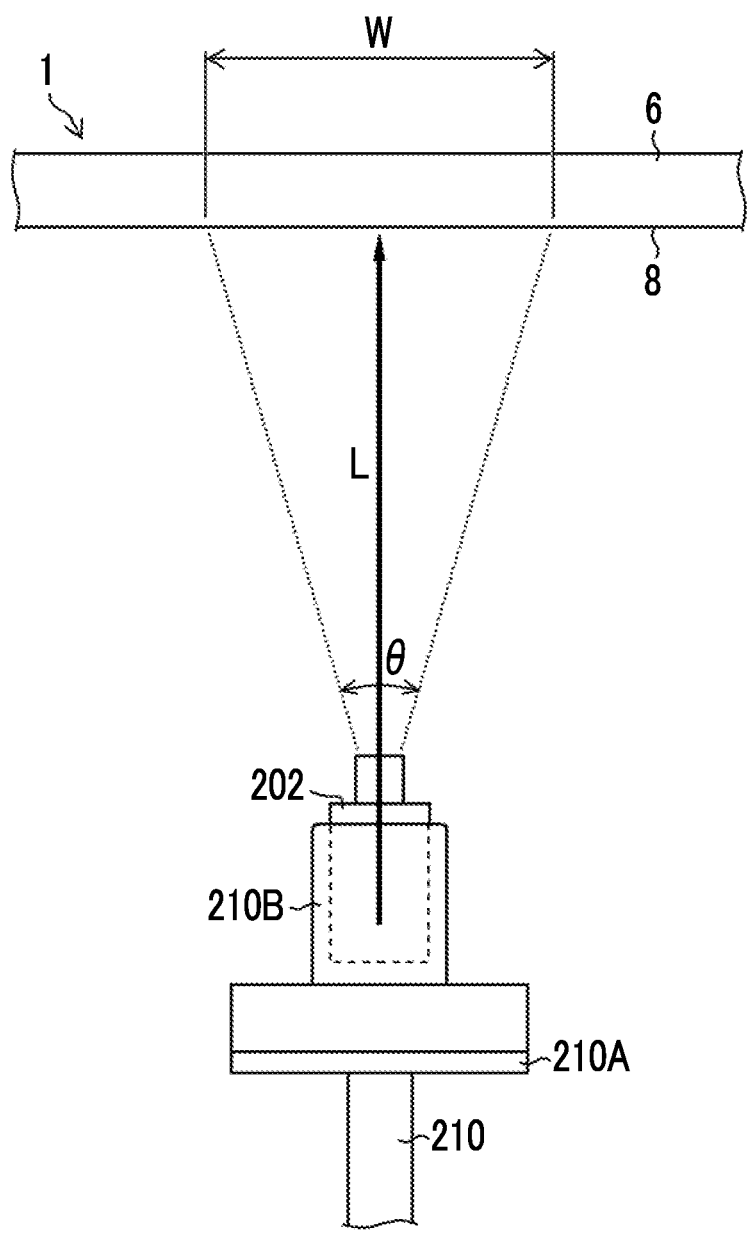
FIG. 5 is a vertical cross-sectional view of the movable imaging device.

FIG. 5 is the same vertical cross-sectional view as FIG. 2, and is a diagram showing the calculation of definition. The definition to be described here is an example of definition and is definition that is represented by the number of pixels of an imaging area per unit length (the number of pixels/m).

L in FIG. 5 denotes a distance between the camera 202 and the back surface 8 of the floor slab 6, that is, a subject distance, θ denotes the angle of view, and W denotes the width of an imaging area. Further, the number of pixels of the imaging element of the camera 202 is denoted by R.

Definition S can be obtained from the following equation.

$$\text{Definition } S = R/W \qquad \text{(Equation)}$$

The width W of an imaging area is calculated from the angle θ of view and the subject distance L.

Here, the subject distance L is acquired by a subject distance acquiring unit 130. The subject distance acquiring unit 130 can acquire the subject distance L by various publicly known methods. For example, the subject distance acquiring unit 130 may calculate the subject distance on the basis of the focal length of the imaging optical system 203 of the camera 202, and may directly calculate a distance between the camera 202 and a subject by using a laser or the like.

The angle θ of view is calculated by a publicly known method. Further, the angle θ of view mentioned here may be a horizontal angle of view and may be a vertical angle of view.

Figure 6:
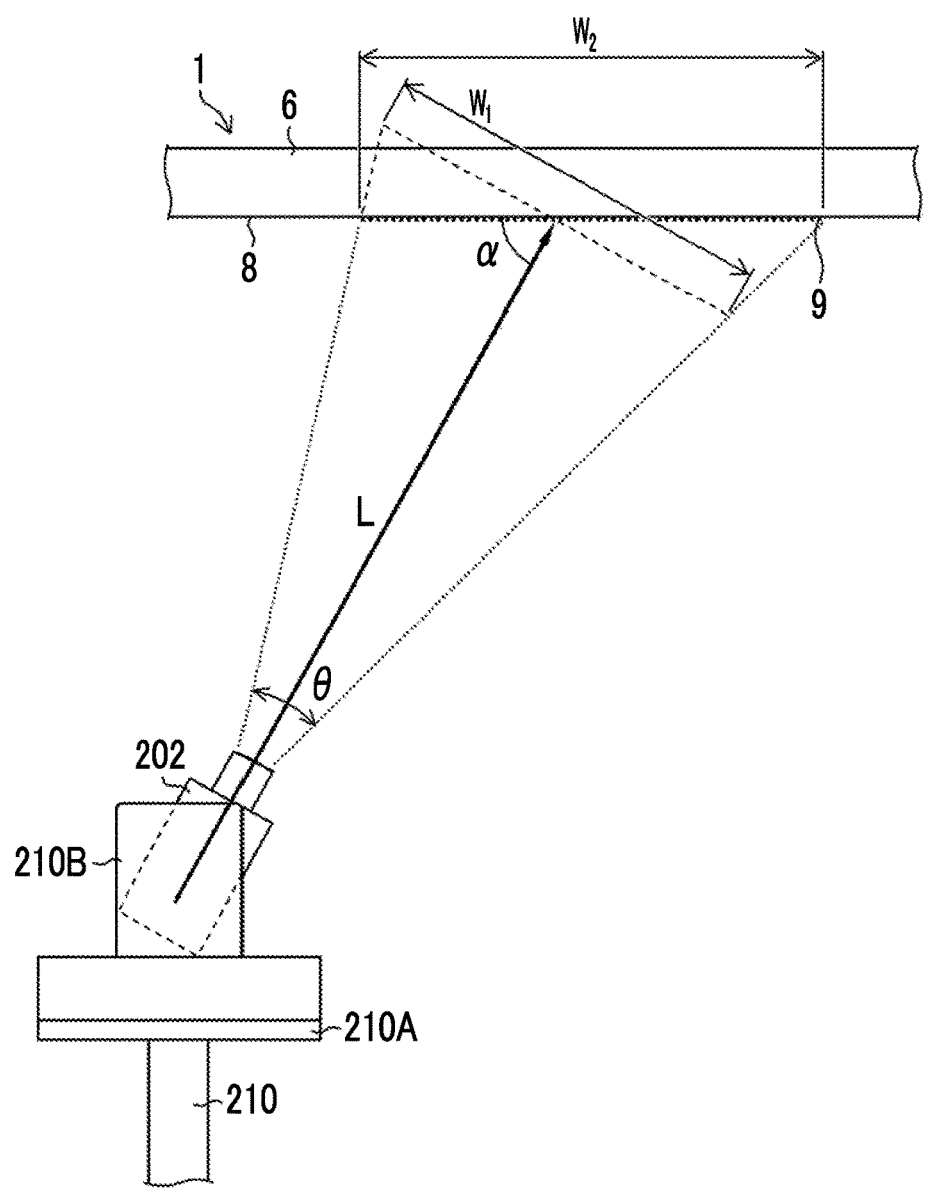
FIG. 6 is a vertical cross-sectional view of the movable imaging device.

FIG. 6 is the same cross-sectional view as FIG. 2, and shows a case in which an angle (imaging angle) between the flat surface of an imaging area (the back surface 8 of the floor slab 6 in the case of FIG. 6) and an optical axis is α. In a case in which the imaging angle α is not 90° like this, the subject distance L and the angle θ of view are obtained to calculate a width $W_1$. However, the width $W_1$ does not mean the width $W_2$ of the imaging area to be actually imaged. That is, in a case in which the imaging angle is not 90° (the camera 202 does not directly face the back surface 8), the width $W_2$ of the imaging area to be actually imaged is larger than the width $W_1$ calculated from the subject distance L and the angle θ of view. Accordingly, the imaging angle α is acquired by the imaging angle acquiring unit 132 and the width $W_2$ of the imaging area is obtained using the acquired imaging angle α, so that accurate definition S can be calculated. Further, the definition calculation unit 128 can also calculate the definition of an image at an end portion 9 of the imaging area, which is most distant from the camera 202, as the definition of the image for inspection. Since it is thought that the definition of the image for inspection is lowest at the end portion 9 of the imaging area most distant from the camera 202, the high accuracy of inspection can be maintained by determination using the definition of the image for inspection at the end portion. The definition of the image for inspection at the end portion 9 of the imaging area, which is most distant from the camera 202, is acquired by a publicly known method.

Figure 7:
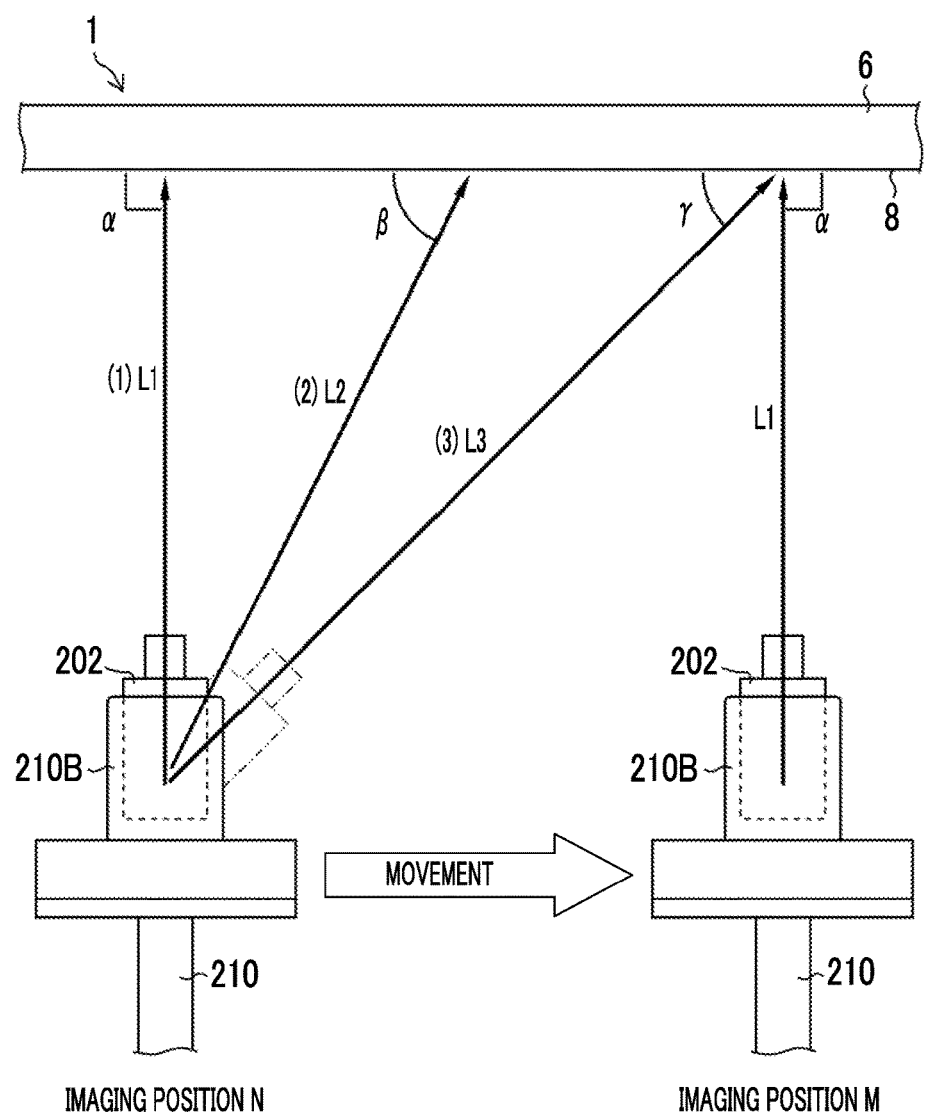
FIG. 7 is a vertical cross-sectional view of the movable imaging device.

FIG. 7 is the same cross-sectional view as FIG. 2, and shows a case in which different imaging areas are imaged through the rotation of the camera in the tilt direction. That is, FIG. 7 is a diagram showing a case in which an image for inspection of a first imaging area is taken ((1) in FIG. 7), a case in which an image for inspection of a second imaging area is taken ((2) in FIG. 7), and a case in which an image for inspection of a third imaging area is taken ((3) in FIG. 7).

First, the case in which the image for inspection of the first imaging area is taken will be described ((1) in FIG. 7). In a case in which the camera 202 faces the imaging direction to the first imaging area, the movable imaging device 10 is at an imaging position N, the imaging angle between the optical axis of the camera 202 and the flat surface of the imaging area is α (90°), and the subject distance is L1. In this case, the definition of the image for inspection to be taken is equal to or higher than the required definition, and the image for inspection is taken by the camera 202.

Next, the case in which the image for inspection of the second imaging area is taken will be described ((2) in FIG. 7). After the taking of the image for inspection of the first imaging area is completed, the movable imaging device 10 tilts and rotates the camera 202 at the imaging position N so that the camera 202 faces the imaging direction to the second imaging area. In this case, the imaging angle is β (β<90°) and the subject distance is L2 (L2>L1). Further, since the definition of the image for inspection of the second imaging area is equal to or higher than the required definition, the image for inspection is taken by the camera 202. Since the subject distance L2 is longer than the subject distance L1 and the imaging angle is β, the width of the imaging area is increased. Accordingly, the definition of the image for inspection of the second imaging area is lower than the definition of the image for inspection of the first imaging area.

Next, the case in which the image for inspection of the third imaging area is taken will be described ((3) in FIG. 7). After the taking of the image for inspection of the second imaging area is completed, the movable imaging device 10 tilts and rotates the camera 202 at the imaging position N so that the camera 202 faces the imaging direction to the third imaging area. In this case, the imaging angle is γ (γ<β<90°) and the subject distance is L3 (L3>L2>L1). Further, since the definition of the image for inspection of the third imaging area is lower than the required definition, the movable imaging device 10 is moved to an imaging position M.

Since the imaging angle is α (=90°) and the subject distance is L1 in a case in which the movable imaging device 10 is at an imaging position M, the definition of the image for inspection to be taken is equal to or higher than the required definition and the image for inspection is taken by the camera 202.

As described above, the movable imaging device 10 changes the imaging direction of the camera 202 by the pan/tilt mechanism to image different imaging areas and moves the moving body 101 to acquire an image for inspection, which satisfies the required definition, in a case in which the definition of the image for inspection is lower than the required definition.

Returning to FIG. 4, a determination unit 134 determines whether the definition calculated by the definition calculation unit 128 is equal to or higher than the required definition required for the inspection accuracy of an object to be inspected. That is, the determination unit 134 compares the preset required definition with the definition of the image for inspection, which is calculated by the definition calculation unit 128, to determine whether or not the image for inspection reaches accuracy required for inspection. Then, the determination unit 134 transmits a determination result to the pan/tilt control unit 122, the moving body control unit 106, and the imaging control unit 204.

The pan/tilt control unit 122, which receives the determination result from the determination unit 134, operates the pan/tilt mechanism in a case in which it is determined that the definition of the image for inspection is equal to or higher than the required definition.

Further, in a case in which the pan/tilt mechanism is operated by the pan/tilt control unit 122 and it is determined that the definition calculated by the determination unit 134 is lower than the required definition, the moving body control unit 106, which receives the determination result from the determination unit 134, moves the moving body 101.

Furthermore, the imaging control unit 204, which receives the determination result from the determination unit 134, makes the camera 202 image the object to be inspected in a case in which it is determined that the calculated definition is equal to or higher than the required definition.

Moreover, the determination unit 134 transmits the determination result to a stop unit 138, and the stop unit 138, which receives the determination result, outputs a stop command for stopping the drive of the pan/tilt mechanism in a case in which the determination unit 134 determines that the definition calculated by the definition calculation unit 128 is lower than the required definition required for the inspection accuracy of the object to be inspected. Further, the stop unit 138 outputs a stop command for stopping the movement of the moving body 101 in a case in which the determination unit 134 determines that the definition calculated by the definition calculation unit 128 is equal to or higher than the required definition required for the inspection accuracy of the object to be inspected. As described above, the stop unit 138 has a function to stop the drive of the pan/tilt mechanism (pan/tilt stop unit) in a case in which it is determined that the definition calculated by the definition calculation unit 128 is lower than the required definition, and has a function to stop the movement of the moving body 101 (moving body stop unit) in a case in which it is determined that the definition calculated by the definition calculation unit 128 is equal to or higher than the required definition.

Furthermore, the determination unit 134 transmits the determination result to the information unit 136. Then, the information unit 136, which receives the determination result, issues a warning in a case in which it is determined that the definition calculated by the definition calculation unit 128 is lower than the required definition required for the inspection accuracy of the object to be inspected. Further, in a case in which the determination unit 134 determines that the definition calculated by the definition calculation unit 128 is equal to or higher than the required definition required for the inspection accuracy of the object to be inspected, the information unit 136 informs a user that the image for inspection can be taken. The informing performed by the information unit 136 can be performed by various methods. For example, the information unit 136 can inform a user by displaying a warning on the display unit 306 of the terminal 300.

The terminal 300 mainly includes the terminal-communication unit 305, the display unit 306, the pan/tilt operation receiving unit 303, the movement operation receiving unit 302, and the imaging operation receiving unit 304.

The display unit 306 (a live-view image display unit or a unit for displaying the image for inspection) displays a live-view image and an image for inspection that are acquired by the camera 202 and are received through the terminal-communication unit 305. Further, a warning sign, which is output from the information unit 136 and is obtained in a case in which it is determined that the calculated definition is lower than the required definition required for the inspection accuracy of the object to be inspected, is displayed on the display unit 306.

The pan/tilt operation receiving unit 303 receives a pan/tilt operation from a user. For example, the user can also give a command of a pan/tilt operation through the pan/tilt operation receiving unit 303 while viewing the live-view image displayed on the display unit 306.

The movement operation receiving unit 302 receives a command of a movement operation from the user. The movement operation receiving unit 302 receives commands relating to the movement of the moving body 101 in the X direction, the movement of the moving body 101 in the Y direction, and the movement of the vertical telescopic arm 210.

The imaging operation receiving unit 304 receives a command of an imaging operation form the user. The user can give a command for acquiring an image for inspection by the camera 202 while viewing the live-view image displayed on the display unit 306.

Figure 8:
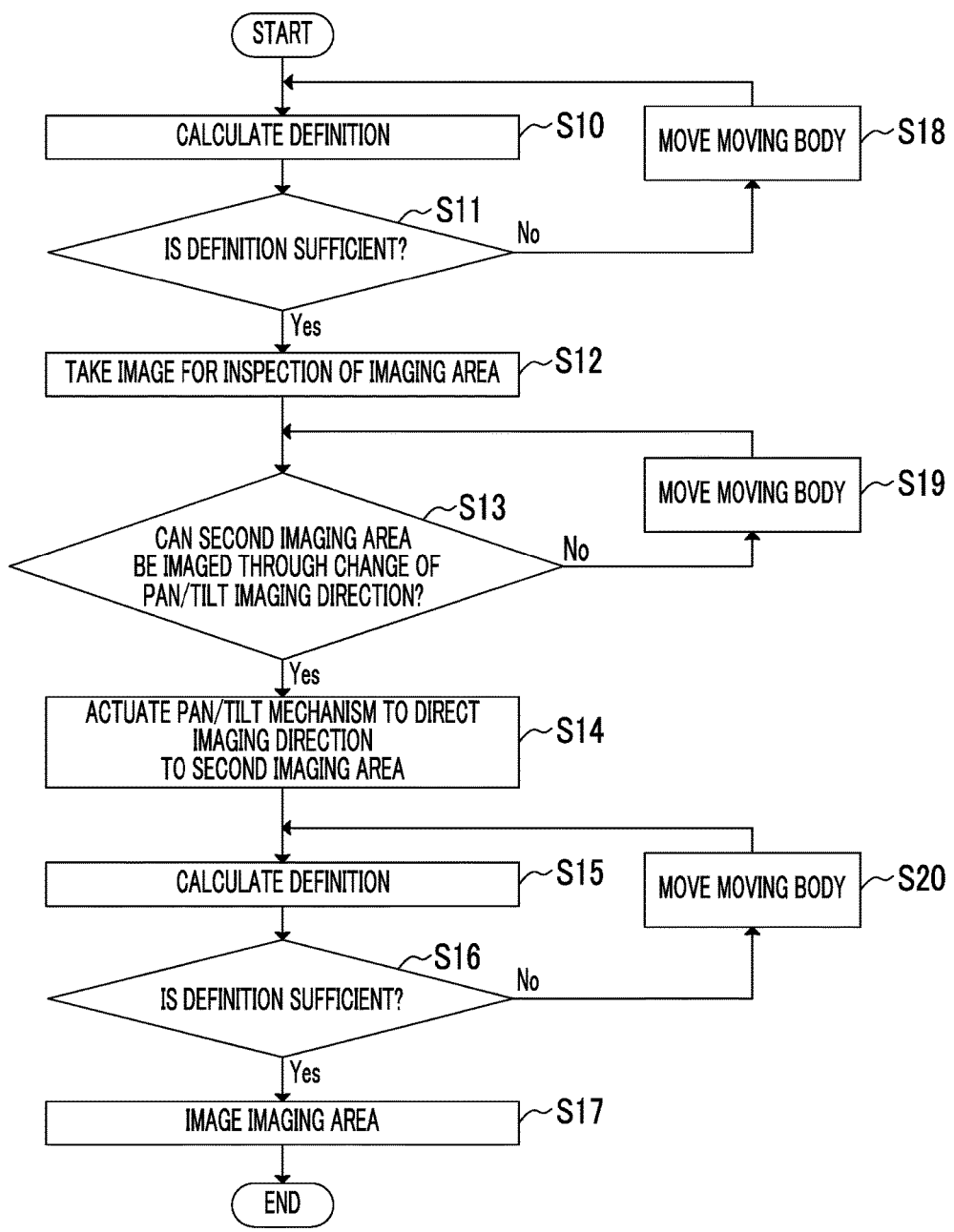
FIG. 8 is a flow chart relating to the operation of the movable imaging device.

FIG. 8 is a flow chart relating to the operation of the movable imaging device 10. FIG. 8 shows the flow of operations of the movable imaging device 10 for acquiring the image for inspection of the first imaging area and the image for inspection of the second imaging area.

First, the movable imaging device 10 performs an operation for acquiring the image for inspection of the first imaging area.

First, the movable imaging device 10 stops at a first imaging position and captures the first imaging area by the camera 202. Then, the definition calculation unit 128 calculates definition in a case in which the image for inspection of the first imaging area is acquired at the first imaging position (Step S10: definition calculating step). After that, the determination unit 134 determines whether the definition calculated by the definition calculation unit 128 is equal to or higher than the required definition required for the inspection accuracy of an object to be inspected (Step S11: determination step). If the definition of the image for inspection is lower than the required definition ("NO" in Step S11), the movable imaging device 10 moves the moving body 101 (Step S18).

On the other hand, if the definition of the image for inspection is equal to or higher than the required definition, the imaging control unit 204 makes the camera 202 take the image for inspection of the first imaging area (Step S12: imaging control step).

Next, the movable imaging device 10 performs an operation for taking the image for inspection of the second imaging area.

First, the imaging control unit 204 determines whether or not the second imaging area can be imaged through the change in the imaging direction of the camera 202 using the pan/tilt mechanism (Step S13). If the second imaging area cannot be imaged (in the case of "NO" in Step S13) even though the imaging direction of the camera 202 is changed by the pan/tilt mechanism, the movable imaging device 10 moves the moving body 101 so that the second imaging area is captured by the camera 202 (Step S19).

On the other hand, if the second imaging area can be imaged through the change in the imaging direction of the camera 202 using the pan/tilt mechanism, the imaging direction of the camera 202 is directed to the second imaging area by the actuation of the pan/tilt mechanism (Step S14: pan/tilt control step).

Then, the definition calculation unit 128 calculates definition in a case in which the image for inspection of the second imaging area is acquired (Step S15: definition calculating step). After that, the determination unit 134 determines whether the definition calculated by the definition calculation unit 128 is equal to or higher than the required definition (Step S16: determination step).

If the definition of the image for inspection is lower than the required definition ("NO" in Step S16), the movable imaging device 10 moves the moving body 101 (Step S20: moving body control step).

On the other hand, if the definition of the image for inspection is equal to or higher than the required definition, image for inspection of the second imaging area is taken (Step S17: imaging control step).

Next, the flow of an operation in a case in which the definition of an image for inspection of the next imaging area is to be calculated before the operation of the pan/tilt mechanism will be described.

After that, an example of the operation of the movable imaging device 10 will be described.

Figure 9:
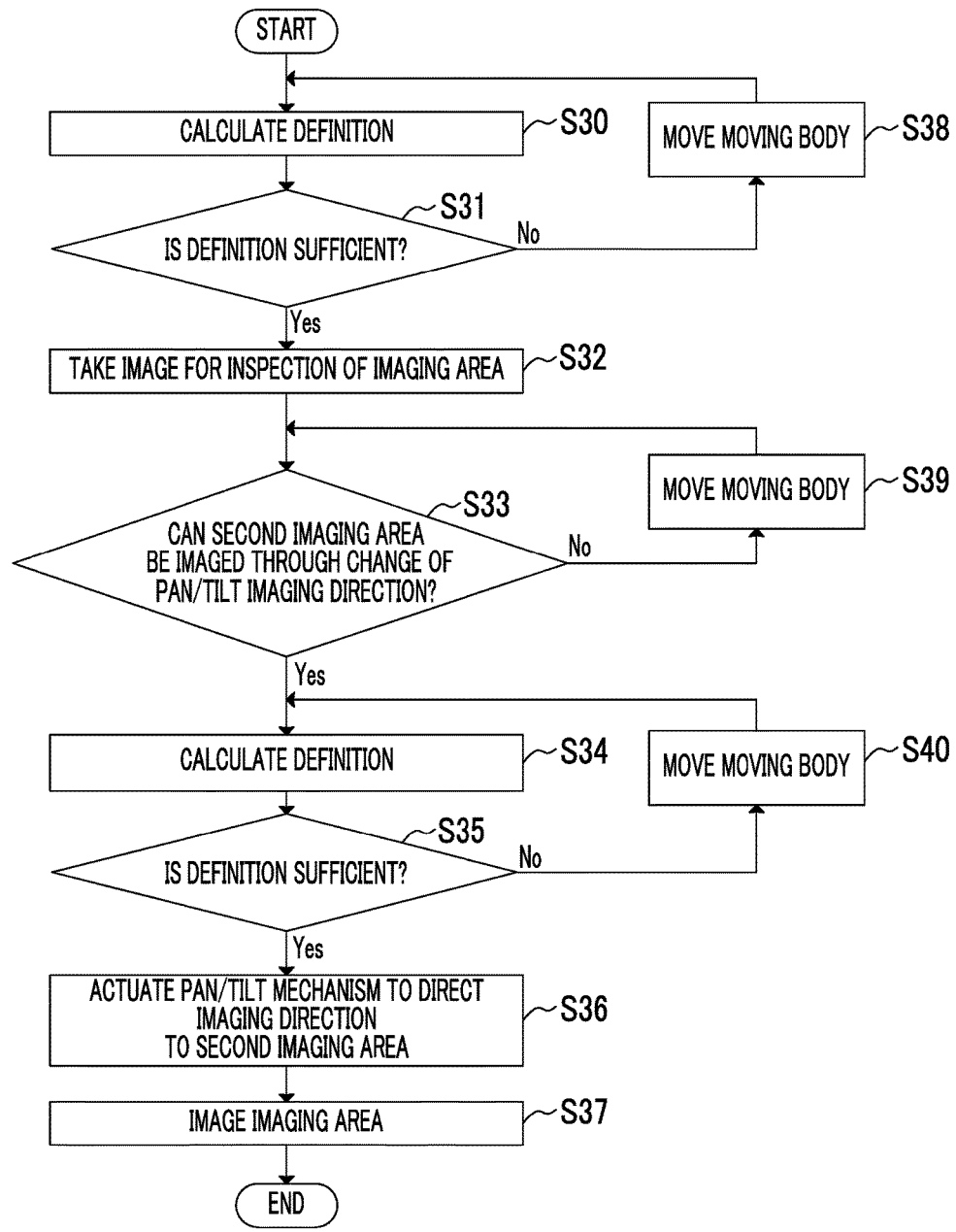
FIG. 9 is a flow chart relating to the operation of the movable imaging device.

FIG. 9 is a flow chart relating to operations of the movable imaging device 10 for acquiring the image for inspection of the first imaging area and the image for inspection of the second imaging area as in FIG. 8. The flow of the operations shown in FIG. 9 is different from the flow of the operation shown in FIG. 8 in that the pan/tilt mechanism is actuated after it is determined that the definition of the image for inspection is equal to or higher than the required definition.

First, the movable imaging device 10 performs an operation for acquiring the image for inspection of the first imaging area.

First, the movable imaging device 10 stops at a first imaging position and captures the first imaging area by the camera 202. Then, the definition calculation unit 128 calculates definition in a case in which the image for inspection of the first imaging area is acquired at the first imaging position (Step S30: definition calculating step). After that, the determination unit 134 determines whether the definition calculated by the definition calculation unit 128 is equal to or higher than the required definition required for the inspection accuracy of an object to be inspected (Step S31: determination step). If the definition of the image for inspection is lower than the required definition ("NO" in Step S31), the movable imaging device 10 moves the moving body 101 (Step S38).

On the other hand, if the definition of the image for inspection is equal to or higher than the required definition, the image for inspection of the first imaging area is taken (Step S32: imaging control step).

Next, the movable imaging device 10 performs an operation for taking the image for inspection of the second imaging area.

First, the imaging control unit 204 determines whether or not the second imaging area can be imaged through the change in the imaging direction of the camera 202 using the pan/tilt mechanism (Step S33). If the second imaging area cannot be imaged (in the case of "NO" in Step S33) even though the imaging direction of the camera 202 is changed by the pan/tilt mechanism, the movable imaging device 10 moves the moving body 101 so that the second imaging area is captured by the camera 202 (Step S39).

On the other hand, if the second imaging area can be imaged through the change in the imaging direction of the camera 202 using the pan/tilt mechanism, the definition calculation unit 128 calculates definition in a case in which the image for inspection of the second imaging area is acquired (Step S34: definition calculating step). After that, the determination unit 134 determines whether the definition calculated by the definition calculation unit 128 is equal to or higher than the required definition (Step S35: determination step). If the determination unit 134 determines that the definition of the image for inspection is lower than the required definition, the movable imaging device 10 moves the moving body 101 (Step S40: moving body control step). On the other hand, if it is determined that the definition of the image for inspection is equal to or higher than the required definition, the imaging direction of the camera 202 is directed to the second imaging area by the actuation of the pan/tilt mechanism (Step S36). Then, the image for inspection of the second imaging area is taken by the camera 202 (Step S37: imaging control step).

Each configuration and function, which has been described above, can be appropriately achieved by hardware, software, or a combination of hardware and software. For example, the invention can be applied to a program that allows a computer to perform the above-mentioned processing step (procedure), a computer-readable recording medium (non-transitory recording medium) on which such a program is recorded, and a computer in which such a program can be installed.

As described above, the movable imaging device 10 of the invention takes an image for inspection by driving the pan/tilt mechanism without moving the moving body 101 in a case in which the definition of the image for inspection is equal to or higher than the required definition required for the inspection accuracy of the object to be inspected. Accordingly, since the movable imaging device 10 can reduce the moving time of the moving body 101 and the number of times of movement of the moving body 101, the movable imaging device 10 can reduce time that is taken for the entire inspection.

In addition, the movable imaging device 10 moves the moving body 101 to the next imaging position in a case in which the definition of the image for inspection is lower than the required definition required for the inspection accuracy of the image for inspection. Accordingly, the movable imaging device 10 can acquire a high-quality image for inspection that can satisfy the required inspection accuracy.

Moreover, the movable imaging device 10 can acquire an image for inspection of a wide range without requiring a relatively large device by controlling the actuation of the pan/tilt mechanism and the movement of the moving body 101.

MODIFICATION EXAMPLE 1

Next, Modification example 1 of the movable imaging device 10 will be described. An imaging control unit 204 of the movable imaging device 10 of this example includes an imaging condition determining unit that determines imaging conditions of the camera 202. Further, the imaging condition determining unit determines the imaging conditions on the basis of the imaging angle that is acquired by the imaging angle acquiring unit 132. For example, the imaging condition determining unit determines a diaphragm value (F-number) on the basis of the imaging angle that is acquired by the imaging angle acquiring unit 132.

Figure 10:
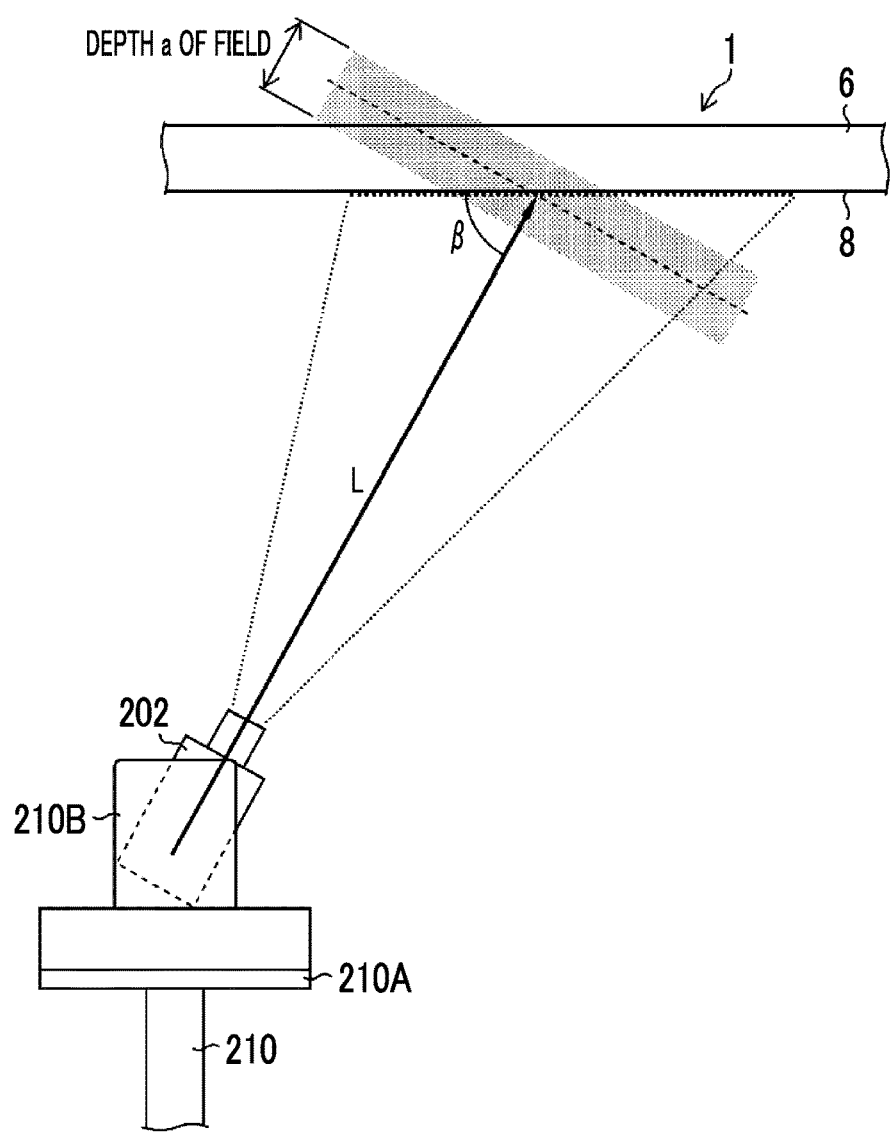
FIG. 10 is a vertical cross-sectional view of the movable imaging device.

FIG. 10 is the same cross-sectional view as FIG. 2, and shows a case in which an imaging angle is β. In a case in which the imaging angle is not 90°, that is, in a case in which a camera 202 does not directly face a subject, there is a case where an object to be inspected is not in the depth of field of the camera 202. Accordingly, the imaging condition determining unit increases the depth of field by adjusting the diaphragm value (F-number) in accordance with the imaging angle that is acquired by the imaging angle acquiring unit 132. Therefore, an image for inspection of which blurring is suppressed can be acquired even though the imaging angle is an acute angle. For example, the depth a of field may be determined depending on image quality that is required for an image for inspection.

Further, the imaging control unit 204 performs focus bracket imaging for taking an image with the movement of a focus position in a case in which the imaging angle acquired by the imaging angle acquiring unit 132 is equal to or smaller than a reference angle.

As the imaging angle becomes an acute angle, there is a case where it is difficult to suppress the blurring of an image for inspection by only increasing the depth of field as described above. In this case, the imaging control unit 204 can acquire an image, of which blurring is suppressed in the imaging area, by performing the focus bracket imaging for taking an image with the movement of a focus position. Here, the reference angle may be determined depending on image quality that is required for an image for inspection.

Further, the imaging control unit 204 may determine the number of times of the focus bracket imaging or the moving distance of a focus in the focus bracket imaging on the basis of at least one of the imaging angle, the subject distance, and the diaphragm value of the camera 202. Accordingly, since more appropriate focus bracket imaging can be performed, a higher-quality image for inspection can be acquired.

Since focus bracket imaging for taking an image is performed at a plurality of focus positions as described above, a high-quality image for inspection of which blurring is suppressed can be acquired even though the imaging angle is an acute angle.

MODIFICATION EXAMPLE 2

Next, Modification example 2 of the movable imaging device 10 will be described. A definition calculation unit 128 corrects the definition, which is calculated, on the basis of optical characteristics of an optical system of the camera 202.

Figure 11:
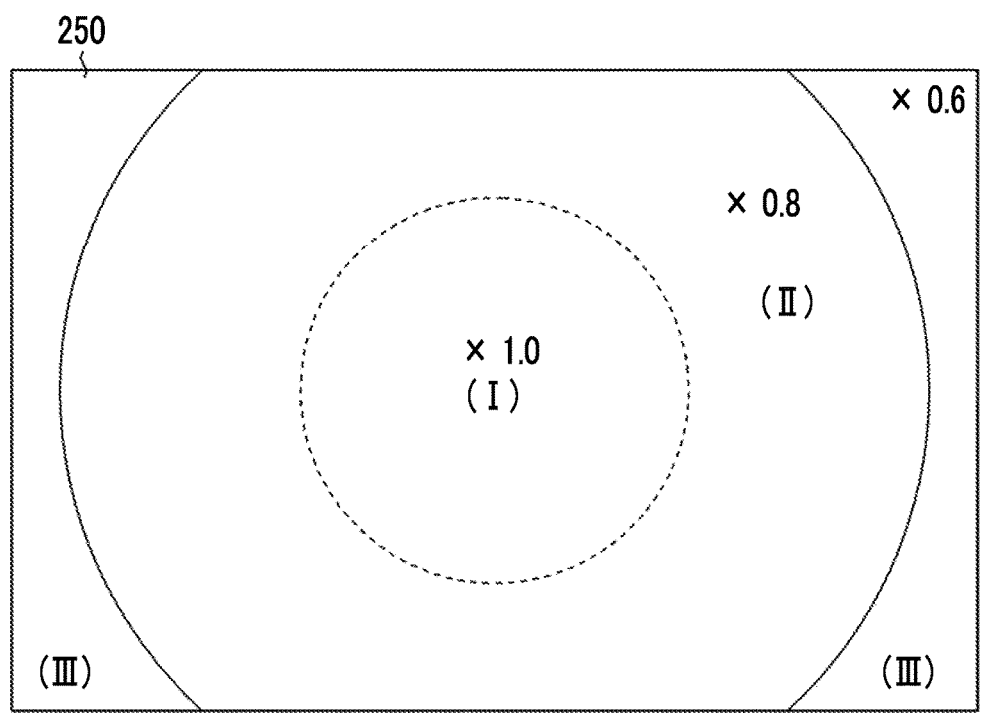
FIG. 11 is a diagram conceptually showing an image for inspection.

FIG. 11 is a diagram conceptually showing an image 250 for inspection. There is a case where image quality deteriorates at a specific position on the image 250 for inspection in some optical systems. For example, a modulation transfer function (MTF) deteriorates at an end portion of an image for inspection by an optical system being in use, so that image quality deteriorates. Accordingly, as shown in FIG. 11, the definition of an area I is determined as it is by the determination unit 134, the definition of an area II is determined by the determination unit 134 after being multiplied by a coefficient X (=0.8), and the definition of an area III is determined by the determination unit 134 after being multiplied by a coefficient X (=0.6).

According to this example, definition is corrected on the basis of the optical characteristics of the optical system of the camera 202. Accordingly, since an image is determined by using the definition to which the optical characteristics of the optical system of the camera 202 is added, a good-quality image for inspection can be acquired. As a result, inspection accuracy is improved.

MODIFICATION EXAMPLE 3

Next, Modification example 3 of the movable imaging device 10 will be described. The movable imaging device 10 of this example moves while tracking the next imaging area.

Figure 12:
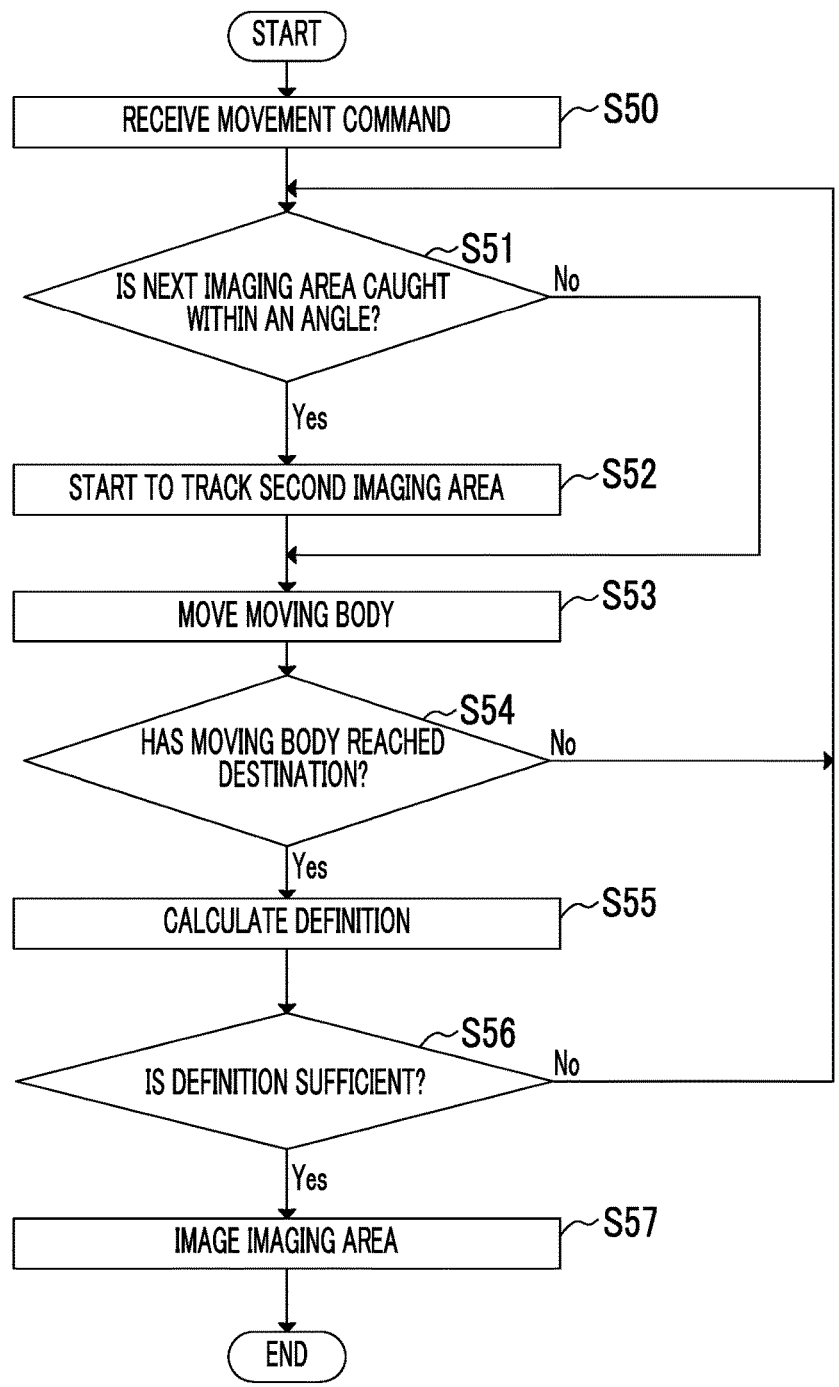
FIG. 12 is a flow chart relating to the operation of the movable imaging device.

FIG. 12 is a diagram showing the flow of an operation in a case in which the movable imaging device 10 of this example is to move.

A case in which the determination unit 134 determines that the definition of the image for inspection is lower than the required definition and the movable imaging device 10 moves the moving body 101 as in Step S20 described in FIG. 8 will be described.

First, the moving body 101 receives a movement command (Step S50). After that, the imaging control unit 204 determines whether or not the second imaging area is caught on the camera 202 before the start of the movement of the moving body 101 (Step S51). If the imaging control unit 204 determines that the second imaging area is not change on the camera 202 (in the case of "NO" in Step S51), the movement of the moving body 101 is started (Step S53).

On the other hand, if the imaging control unit 204 determines that the second imaging area is change on the camera 202 (in the case of "YES" in Step S51), the tracking of the second imaging area is started (Step S52). After that, the moving body 101 starts to move while tracking the second imaging area (Step S53).

The moving body control unit 106 determines whether or not the moving body 101 reaches a destination (Step S54). If the moving body control unit 106 determines that the moving body 101 does not reach the destination (in the case of "NO" in Step S54), the imaging control unit 204 determines whether or not the second imaging area is change on the camera 202 (Step S51).

On the other hand, if the moving body control unit 106 determines that the moving body 101 reaches the destination (in the case of "YES" in Step S54), the definition calculation unit 128 calculates definition in a case in which the image for inspection of the second imaging area is acquired (Step S55). After that, the determination unit 134 determines whether the definition calculated by the definition calculation unit 128 is equal to or higher than the required definition (Step S56).

If the definition of the image for inspection is lower than the required definition (in the case of "NO" in Step S56), the imaging control unit 204 determines whether or not the second imaging area is change on the camera 202 (Step S51).

On the other hand, if the definition of the image for inspection is equal to or higher than the required definition (in the case of "YES" in Step S56), the image for inspection of the second imaging area is taken (Step S57).

MODIFICATION EXAMPLE 4

Next, Modification example 4 of the movable imaging device 10 will be described.

The movable imaging device 10 of this example includes a next-imaging-area specifying unit that specifies a part or all of an area of the object to be inspected, of which an image for inspection is not taken, as the next imaging area on the basis of the image for inspection taken by the camera 202. That is, the movable imaging device 10 specifies an imaging area, which is not yet imaged, and acquires an image for inspection on the basis of the taken image for inspection, which is recorded in the inspection image recording unit 129, and the spatial information of an object to be inspected.

Figure 13:
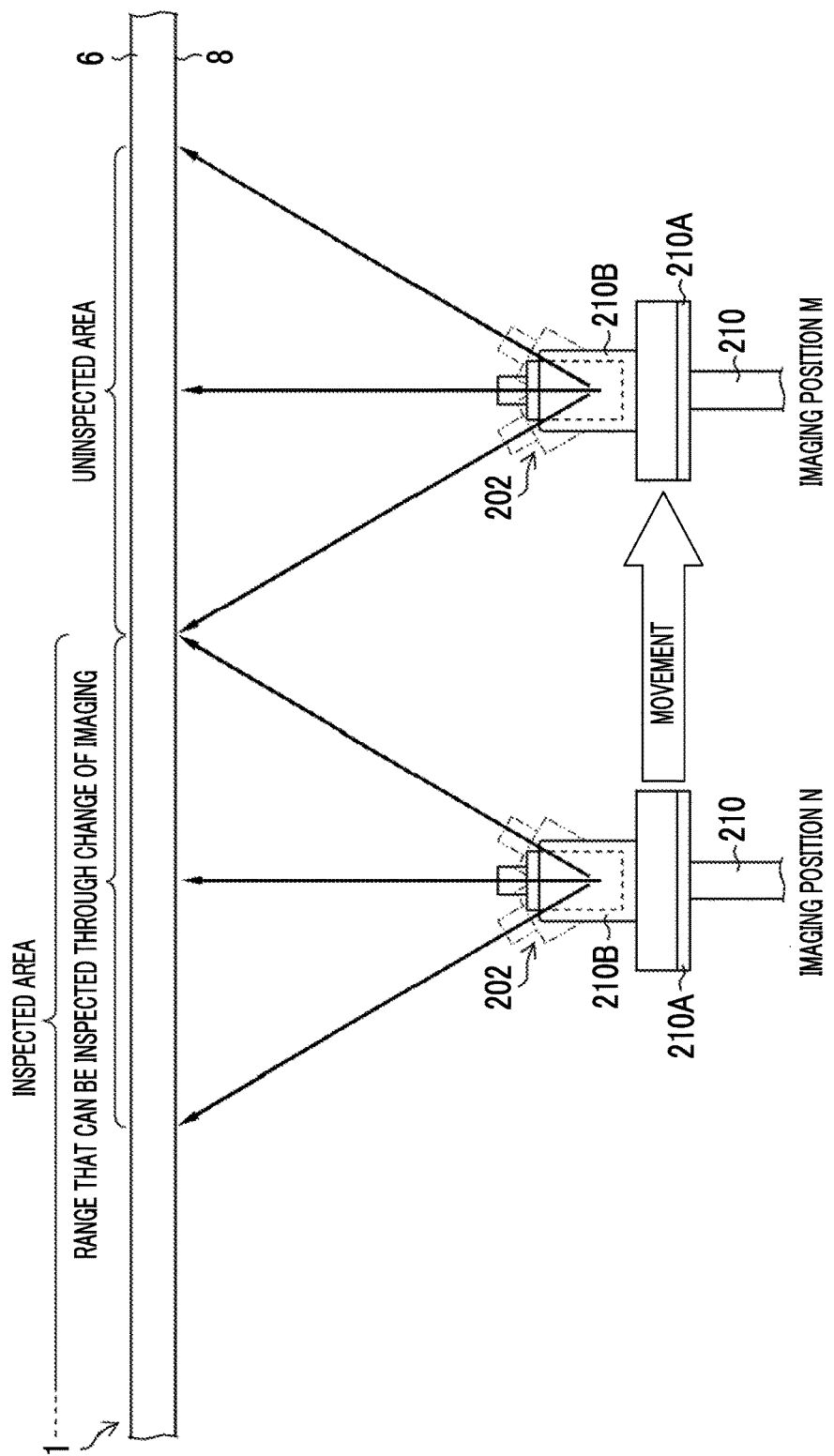
FIG. 13 is a vertical cross-sectional view of the movable imaging device.

FIG. 13 is the same cross-sectional view as FIG. 2, and shows an area of which the image for inspection has been acquired, an area that can be imaged through the change in the imaging direction without the movement of the moving body 101, and an area of which an image for inspection is not yet taken.

As shown in FIG. 13, the movable imaging device 10 moves to the most distant imaging position M (continuously) at a time without stopping in consideration of a range, which can be imaged through the change in the imaging direction after the image for inspection of a range, which can be imaged at the imaging position N through the change in the imaging direction, is completely taken. That is, in a case in which the movement of the moving body 101 is started, the moving body control unit 106 moves the moving body 101 to the most distant position (imaging position M), at which the object to be inspected can be continuously imaged through the operation of the pan/tilt mechanism performed by the pan/tilt control unit 122, at a time without stopping. Accordingly, since the moving body 101 is moved to the most distant position, at which an object to be inspected can be continuously imaged through the operation of the pan/tilt mechanism, at a time without stopping, the widest image for an object to be inspected can be taken by the use of the pan/tilt mechanism to the maximum. Therefore, inspection can be more efficiently performed in this aspect.

Examples of the invention have been described above, but it goes without saying that the invention is not limited to the above-mentioned embodiment and may have various modifications without departing from the scope of the invention.

EXPLANATION OF REFERENCES

1: bridge
2: main girder
3: cross beam
4: cross frame
5: lateral frame
6: floor slab
7: pipe
8: back surface
10: movable imaging device
100: robot body
101: moving body
106: moving body control unit
108: X-direction drive unit
114: Y-direction drive unit
116: Z-direction drive unit
118: robot body-communication unit
122: pan/tilt control unit
128: definition calculation unit
130: subject distance acquiring unit
132: imaging angle acquiring unit
134: determination unit
136: information unit
138: stop unit
202: camera
203: imaging optical system
204: imaging control unit
206: pan/tilt drive unit
210: vertical telescopic arm
210A: camera installation part
210B: camera support part
300: terminal
302: movement operation receiving unit
303: pan/tilt operation receiving unit
304: imaging operation receiving unit 305: terminal-communication unit
306: display unit

What is claimed is:

1. A movable imaging device that images an object to be inspected including a flat surface, the movable imaging device comprising:
   a camera that images the object to be inspected and acquires an image for inspection;
   a pan/tilt mechanism that rotates the camera in each of a pan direction and a tilt direction;
   a moving body on which the camera is mounted and which moves the camera along the flat surface of the object to be inspected;
   a definition calculation unit that calculates definition of the image for inspection acquired by the camera;
   a determination unit that determines whether the definition calculated by the definition calculation unit is equal to or higher than required definition required for inspection accuracy of the object to be inspected;
   a pan/tilt control unit that operates the pan/tilt mechanism to move an imaging area on the object to be inspected and operates the pan/tilt mechanism in a case in which the determination unit determines that the calculated definition is equal to or higher than the required definition;
   a moving body control unit that moves the moving body to move an imaging area on the object to be inspected and moves the moving body in a case in which the pan/tilt mechanism is operated by the pan/tilt control unit and the determination unit determines that the calculated definition is lower than the required definition; and
   an imaging control unit that makes the camera image the object to be inspected in a case in which the determination unit determines that the calculated definition is equal to or higher than the required definition.

2. The movable imaging device according to claim 1, wherein the definition calculation unit includes a subject distance acquiring unit for acquiring a subject distance in a case in which the image for inspection is to be acquired by the camera, and calculates the definition of the image for inspection on the basis of the acquired subject distance, an angle of view of the camera, and the number of pixels of an imaging element of the camera.

3. The movable imaging device according to claim 2, wherein the definition calculation unit includes an imaging angle acquiring unit for acquiring an imaging angle that is an angle between an optical axis of the camera and the flat surface of the imaging area, and calculates the definition of the image for inspection on the basis of the acquired subject distance, the angle of view of the camera, the acquired imaging angle, and the number of pixels of the imaging element of the camera.

4. The movable imaging device according to claim 3, wherein the imaging control unit includes an imaging condition determining unit that determines an imaging condition of the camera, and
   the imaging condition determining unit determines the imaging condition on the basis of the imaging angle that is acquired by the imaging angle acquiring unit.

5. The movable imaging device according to claim 3, wherein the imaging control unit performs focus bracket imaging for taking an image with the movement of a focus position in a case in which the imaging angle acquired by the imaging angle acquiring unit is equal to or smaller than a reference angle.

6. The movable imaging device according to claim 5, wherein the imaging control unit determines the number of times of the focus bracket imaging or a moving distance of a focus in the focus bracket imaging on the basis of at least one of the imaging angle, the subject distance, and a diaphragm value of the camera.

7. The movable imaging device according to claim 1, wherein the definition calculation unit calculates definition at an end portion of the imaging area that is most distant from the camera.

8. The movable imaging device according to claim 1, wherein the definition calculation unit corrects the definition, which is calculated, on the basis of optical characteristics of an optical system of the camera.

9. The movable imaging device according to claim 1, wherein the pan/tilt control unit controls the pan/tilt mechanism during the movement of the moving body performed by the moving body control unit, and tracks the imaging area imaged before the start of the movement of the moving body.

10. The movable imaging device according to claim 1, wherein in a case in which the movement of the moving body is started, the moving body control unit moves the moving body to the most distant position at which the object to be inspected is capable of being continuously imaged through an operation of the pan/tilt mechanism performed by the pan/tilt control unit.

11. The movable imaging device according to claim 1, further comprising:
    a next-imaging-area specifying unit that specifies a part or all of an area of the object to be inspected, of which an image for inspection is not taken, as the next imaging area on the basis of the image for inspection taken by the camera.

12. The movable imaging device according to claim 1, wherein the camera includes an imaging optical system of which an imaging magnification is adjustable.

13. The movable imaging device according to claim 1, further comprising:
    a live-view image display unit that displays a live-view image taken by the camera;
    a pan/tilt operating unit that outputs a pan/tilt command to the pan/tilt mechanism by a manual operation; and
    an information unit that issues a warning in a case in which the determination unit determines that the definition calculated by the definition calculation unit is lower than the required definition required for the inspection accuracy of the object to be inspected,
    wherein the pan/tilt control unit controls the pan/tilt mechanism on the basis of the pan/tilt command output from the pan/tilt operating unit.

14. The movable imaging device according to claim 1, further comprising:
    a pan/tilt operating unit that outputs a pan/tilt command to the pan/tilt mechanism by a manual operation; and
    a pan/tilt stop unit that outputs a stop command for stopping the drive of the pan/tilt mechanism in a case in which the determination unit determines that the definition calculated by the definition calculation unit is lower than the required definition required for the inspection accuracy of the object to be inspected,
    wherein the pan/tilt control unit controls the pan/tilt mechanism on the basis of the pan/tilt command output from the pan/tilt operating unit and the stop command output from the pan/tilt stop unit.

15. The movable imaging device according to claim 1, further comprising:

a movement operating unit that outputs a movement command to the moving body by a manual operation; and an information unit that informs a user that the image for inspection is capable of being taken in a case in which the determination unit determines that the definition calculated by the definition calculation unit is equal to or higher than the required definition required for the inspection accuracy of the object to be inspected, wherein the moving body control unit controls the moving body on the basis of the movement command output from the movement operating unit.

16. The movable imaging device according to claim 1, further comprising:

a movement operating unit that outputs a movement command to the moving body by a manual operation; and a moving body stop unit that outputs a stop command for stopping the movement of the moving body in a case in which the determination unit determines that the definition calculated by the definition calculation unit is equal to or higher than the required definition required for the inspection accuracy of the object to be inspected, wherein the moving body control unit controls the moving body on the basis of the movement command output from the movement operating unit and the stop command output from the moving body stop unit.

17. A movable imaging method of imaging an object to be inspected including a flat surface and using a movable imaging device including a camera that images the object to be inspected and acquires an image for inspection, a pan/tilt mechanism that rotates the camera in each of a pan direction and a tilt direction, and a moving body on which the camera is mounted and which moves the camera along the flat surface of the object to be inspected, the movable imaging method comprising:

a definition calculating step of calculating definition of the image for inspection acquired by the camera;

a determination step of determining whether the definition calculated by the definition calculating step is equal to or higher than required definition required for inspection accuracy of the object to be inspected;

a pan/tilt control step of operating the pan/tilt mechanism to move an imaging area on the object to be inspected and operating the pan/tilt mechanism in a case in which it is determined in the determination step that the calculated definition is equal to or higher than the required definition;

a moving body control step of moving the moving body to move an imaging area on the object to be inspected and moving the moving body in a case in which the pan/tilt mechanism is operated in the pan/tilt control step and it is determined in the determination step that the calculated definition is lower than the required definition; and an imaging control step of imaging the object to be inspected by the camera in a case in which it is determined in the determination step that the calculated definition is equal to or higher than the required definition.

* * * * *